Patented Aug. 3, 1954

2,685,592

UNITED STATES PATENT OFFICE 2,685,592

METHOD OF MAKING HARD BUTTER

George Barsky, New York, N. Y., and George Zinzalian, Boonton, N. J., assignors to E. F. Drew & Co., Inc., New York, N. Y., a corporation of Delaware No Drawing. Application February 10, 1951, Serial No. 210,435

8 Claims. (Cl. 260—410.7)

The present invention is directed to edible vegetable fats, more particularly to a type which is known in the trade as hard butter.

Compositions of this type are glyceride esters of higher fatty acids which are solid at ordinary room temperatures. They are used as ingredients in such compositions as icings for baked goods and in candy coatings such as chocolate covered candies. They are also used in various compositions for edible purposes. The properties necessary for a product of this kind are important and the specifications which have been set up are relatively rigid. The processes previously used in making such hard butters have not been completely satisfactory as the ordinary esterification processes do not lend themselves to ready reproduction of results so that the desired properties were not obtained. Also there were various losses due to the manner of operation and other difficulties were encountered during the operations.

The present invention is intended and adapted to overcome the difficulties and disadvantages inherent in processes of the prior art, it being among the objects of the present invention to provide a process for esterifying higher fatty acids with glycerine whereby a hard butter is obtained which is eminently adapted for use in coatings, icings and other edibles of various types.

It is also among the objects of the present invention to provide a process which may be readily controlled and which may be conducted from time to time without any difficulty to give substantially identical results in the finished hard butter.

It is further among the objects of the present invention to provide a process which results in a product which is smooth, has a relatively high melting point, which rapidly melts in the mouth to give a free flowing liquid and which is substantially free from greasiness at ordinary temperatures and free from chewiness in the mouth.

It is still further among the objects of the present invention to provide a process which minimizes the loss of constituents during the operation, which minimizes the time necessary for processing, reduces the subsequent refining loss and results in a product which is more readily bleached.

In practicing the present invention there is provided a mixture of fatty acids, of which lauric acid is the major constituent and which contains a substantial amount of myristic acid. The acid composition also contains in most cases a relatively small amount of fatty acids of a coconut type oil having 8 and 10 carbon atoms and a slightly greater amount of fatty acids of such oil having 16 and 18 carbon atoms.

The mixture of fatty acid is incorporated with an amount of glycerine sufficient to provide at the end of the reaction an excess of fatty acids of about 5% to 10% over the molecular equivalent necessary to form the neutral mixed triglycerides of the fatty acids. The mixture is heated in a suitable reaction vessel equipped with an agitator and a reflux condenser up to a temperature of about 450° F. with a vacuum of about 25 inches of mercury. The reaction mixture is held at said temperature and pressure for several hours, after which the temperature is gradually increased to about 550° F. Total time to this point is about eight hours. The temperature of the reflux is such that water vapor is allowed to pass out of the system.

During these operations, the principal reactions take place. At the pressure used and the specified excess of fatty acids, the formation of triglycerides is accelerated and the presence of mono- and diglycerides is minimized for all practical purposes. The relatively low vacuum used prevents glycerine from being removed from the zone of reaction.

During the aforesaid reaction stage, refluxing takes place so that the reactants which may have become vaporized during the operation are condensed in the reflux condenser and returned to the reaction zone. The temperature of the reflux condenser is sufficiently high so that steam generated during the esterification reaction is removed and separately condensed.

Then the vacuum in the reaction vessel is increased to about 29 inches of mercury and the heating at the stated maximum temperature is continued for an additional hour. The reflux may be connected to a distillation line or the vapor line from the kettle may be connected to a distillation condenser. During this operation the excess of free fatty acid still present in the reaction product is removed.

Towards the end of the distillation operation a current of steam is passed through the reaction mass which is continuously agitated throughout the entire operation. The steam removes lower fatty acids such as capric and caprylic even though such acids may have been combined in the form of mixed glycerides. This result is obtained by the displacement of the lower fatty acids by the remaining excess higher fatty acids in the reaction vessel.

The product is then removed from the reaction vessel and is cooled. The crude glyceride is refined with an alkali, and bleached in the manner usually employed in the edible oil industry. It is then subjected to a hydrogenation in order to substantially saturate the unsaturated higher fatty acids such as oleic, present in the starting materials.

Because of the substantially fully esterified glycerides, difficulties which had previously been encountered during the hydrogenation have been eliminated and the operation proceeds smoothly and to the desired end point without danger of poisoning the catalyst. For the same reason the refining operation is facilitated and the loss in refining is substantially reduced.

The following are specific examples of the operation of the present invention:

Example 1

5000 lbs. of the mixed higher fatty acids of coconut oil are placed in a suitable heated reaction vessel provided with an agitator and a vacuum connection and with a reflux condenser. The fatty acids consist principally of lauric and myristic acids with minor amounts of adjacent fatty acids and they have an FFA value of 126. There is added to the fatty acids an amount of glycerine theoretically required to combine with about 95% of the fatty acids in the ratio of 1 mol. of glycerine to 3 mols. of the fatty acids.

The mixture is heated until a temperature of 450° F. is reached. This ordinarily requires about 4 hours. A vacuum of about 25 inches is applied during the entire heating operation and cooling water is caused to flow through the reflux condenser at such a rate that the temperature of the vapors passing through the reflux condenser do not exceed 140° F. Heating is continued at a temperature of 450° to 550° F. and the latter temperature is maintained for a sufficient number of hours until the free fatty acid content of the reaction mass remains substantially constant.

The vacuum is then increased to about 29 inches of mercury, the line leading to the reflux condenser is closed and the vapors arising in the reaction vessel are distilled over into a distillate receiver. The vapors consist essentially of excess fatty acids which have not combined with the glycerine. Distillation is continued until the free fatty acid value is less than 3% calculated as oleic acid. The operation requires about an hour.

The reaction product is cooled and then removed from the reaction kettle into a refining kettle. It is then subjected to the usual alkali refining and is then bleached. A typical analysis of the crude ester before refining is as follows:

| | |
|---|---|
| Color (Lovibond Red 5¼″ col.) | 30/15 |
| FFA (as oleic) per cent | 2.5 |
| IV | 18.0 |
| Sap. value | 238.0 |
| Acetyl value | 13.0 |

The product is hydrogenated to reduce the iodine value to less than 1. The product may be used as such in industry or may be mixed with other fatty materials for special purposes.

Example 2

5000 lbs. of a mixture of higher fatty acids derived from the fractional distillation of the fatty acids of babassu oil, and having an FFA of about 124, is placed in a reaction vessel or esterification kettle such as described in Example 1. It is mixed with an amount of substantially pure glycerine such that there is an excess of 5% to 10% of fatty acids over the theoretical quantity calculated to form triglycerides in the ensuing reaction.

The mixture is heated over a period of about 4 hours to a maximum temperature of about 450° F. while maintaining a vacuum of about 26 inches of mercury. The temperature of the vapors passing through the reflux condenser is a maximum of about 140° F. Heating is continued and the temperature is raised to a maximum of about 550° F. over a period of several hours and the temperature is maintained until the rate of decrease of free fatty acid content of the reaction product has dropped to less than 0.5% FFA per hour. The FFA at this point may be about 12% calculated as oleic acid.

Thereafter the lines of the reflux condenser are changed to distillation position, the vacuum is increased to about 29 inches of mercury, heating is continued and the vapors generated in the operation are distilled through to the distillate receiver. When the free fatty acid content of the reaction mass has dropped to not over 4% calculated as oleic acid, the de-acidification is complete. The crude ester is cooled and then run into a refining kettle. It has the following typical analysis:

| | |
|---|---|
| Color (Lovibond Red 5¼″ col.) | 30/15 |
| FFA (as oleic) per cent | 3.5 |
| IV | 19.0 |
| Sap. value | 242.0 |
| Acetyl value | 5.0 |

The esterification reaction requires 8 to 9 hours. The crude ester is then alkali refined, bleached and hydrogenated.

The present process results in a hard butter which is smooth, has a relatively high melting point, but nevertheless melts readily in the mouth to give a free flowing liquid which is highly desirable in commercial requirements. Icings and coatings made with the hard butter do not soften unduly or melt at ordinary summer temperatures and do not stick to the fingers when handled. The consistency of the icings and coatings made with this hard butter is of the exact type desired by the trade. It is substantially free from color and also from odor. These results are reproducible and batch after batch of the product conforms with all of the requirements and specifications of the trade.

We claim:

1. A method of making substantially neutral glyceride esters of higher fatty acids which comprises introducing into a reaction vessel a mixture of said fatty acids and glycerine, the amount of said fatty acids being in excess of that required to form triglycerides in the reaction, heating said mixture to about 450° F. under a vacuum of about 25 inches of mercury to cause esterification to take place, then gradually increasing the temperature to about 550° F., maintaining said latter temperature for a sufficient length of time until the free fatty acid content of the reaction mass becomes substantially constant, thereafter removing said excess of free fatty acids by increasing the vacuum to about 29 inches while maintaining said temperature and distilling off free fatty acids, and recovering the reaction products.

2. A method of making substantially neutral glyceride esters of higher fatty acids which comprises introducing into a reaction vessel a mixture of said fatty acids and glycerine, the amount of said fatty acids being from 5 to 10% in excess of that required to form triglycerides during the reaction, heating said mixture to about 450° F. under a vacuum of about 25 inches of mercury to cause esterification to take place, then gradually increasing the temperature to about 550° F., maintaining said latter temperature for a sufficient length of time until the free fatty acid content of the reaction mass becomes substantially constant, thereafter removing said excess of free fatty acids by increasing the vacuum to about 29 inches while maintaining said temperature and distilling off free fatty acids, and recovering the reaction product.

3. A method of making substantially neutral glyceride esters of higher fatty acids which comprises introducing into a reaction vessel a mixture of said fatty acids and glycerine, the amount of said fatty acids being from 5 to 10% in excess of that required to form triglycerides during the reaction, heating said mixture to about 450° F. over several hours under a vacuum of about 25 inches of mercury to cause esterification to take place, then gradually increasing the temperature to about 550° F. in about eight hours, maintaining said latter temperature for a sufficient length of time until the free fatty acid content of the reaction mass becomes substantially constant, thereafter removing said excess of free fatty acids by increasing the vacuum to about 29 inches while maintaining said temperature for about nine hours and distilling off free fatty acids, and recovering the reaction product.

4. A method of making substantially neutral glyceride esters of higher fatty acids which comprises introducing into a reaction vessel a mixture of said fatty acids and glycerine, the amount of said fatty acids being from 5 to 10% in excess of that required to form triglycerides during the reaction, heating said mixture to about 450° F. under a vacuum of about 25 inches of mercury to cause esterification to take place, then gradually increasing the temperature to about 550° F., refluxing back into said vessel during said heating vapors generated during said reaction while removing steam, maintaining said latter temperature for a sufficient length of time until the free fatty acid content of the reaction mass becomes substantially constant, thereafter removing said excess of free fatty acids by increasing the vacuum to about 29 inches while maintaining said temperature and distilling off free faty acids, and recovering the reaction product.

5. A method of making substantially neutral glyceride esters of higher fatty acids which comprises introducing into a reaction vessel a mixture of said fatty acids and glycerine, the amount of said fatty acids being from 5 to 10% in excess of that required to form triglycerides during the reaction, heating said mixture to about 450° F. under a vacuum of about 25 inches of mercury to cause esterification to take place, then gradually increasing the temperature to about 550° F., maintaining said latter temperature for a sufficient length of time until the free fatty acid content of the reaction mass becomes substantially constant, thereafter removing said excess of free fatty acids by increasing the vacuum to about 29 inches while maintaining said temperature and distilling off free fatty acids, introducing steam into the reaction mass and distilling off vapors of lower fatty acids.

6. A method of making substantially neutral glyceride esters of higher fatty acids which comprises introducing into a reaction vessel a mixture of said fatty acids having principally from 12 to 18 carbon atoms and glycerine, the amount of said fatty acids being from 5 to 10% in excess of that required to form triglycerides during the reaction, heating said mixture to about 450° F. under a vacuum of about 25 inches of mercury to cause esterification to take place, then gradually increasing the temperature to about 550° F., maintaining said latter temperature for a sufficient length of time until the free fatty acid content of the reaction mass becomes substantially constant, thereafter removing said excess of free fatty acids by increasing the vacuum to about 29 inches while maintaining said temperature and distilling off free fatty acids, and recovering the reaction product.

7. A method of making substantially neutral glyceride esters of higher fatty acids which comprises introducing into a reaction vessel a mixture of the higher fraction of the fatty acids of the coconut type of oil containing as the major constituent lauric and myristic acids and glycerine, the amount of said fatty acids being from 5 to 10% in excess of that required to form triglycerides during the reaction, heating said mixture to about 450° F. under a vacuum of about 25 inches of mercury to cause esterification to take place, then gradually increasing the temperature to about 550° F., maintaining said latter temperature for a sufficient length of time until the free fatty acid content of the reaction mass becomes substantially constant, thereafter removing said excess of free fatty acids by increasing the vacuum to about 29 inches while maintaining said temperature and distilling off free fatty acids, and recovering the reaction product.

8. A method of making substantially neutral glyceride esters of higher fatty acids which comprises introducing into a reaction vessel a mixture of the higher fraction of the fatty acids of the coconut type of oil containing as the major constituent lauric and myristic acids and glycerine, the amount of said fatty acids being from 5 to 10% in excess of that required to form triglycerides during the reaction, heating said mixture to about 450° F. under a vacuum of about 25 inches of mercury to cause esterification to take place, then gradually increasing the temperature to about 550° F., maintaining said latter temperature for a sufficient length of time until the free fatty acid content of the reaction mass becomes substantially constant, thereafter removing said excess of free fatty acids by increasing the vacuum to about 29 inches while maintaining said temperature and distilling off free fatty acids in a current of steam to remove fatty acids lower than lauric so that less than 2.5% thereof remains in the reaction product, and recovering the reaction product.

References Cited in the file of this patent

UNITED STATES PATENTS

| Number | Name | Date |
| --- | --- | --- |
| 1,881,563 | Held et al. | Oct. 11, 1932 |
| 2,182,332 | Barsky | Dec. 5, 1939 |
| 2,238,441 | Drew | Apr. 15, 1941 |
| 2,309,949 | Gooding | Feb. 21, 1943 |
| 2,585,027 | Mueller | Feb. 12, 1952 |